(12) United States Patent
De La Bretonière

(10) Patent No.: US 7,054,942 B1
(45) Date of Patent: May 30, 2006

(54) METHOD AND DEVICE FOR PROTECTING DATA COMMUNICATION

(76) Inventor: Ralph Rogier De La Bretonière, Bijhouwerlommer 43, Zoetermeer (NL) NL-2728 JK ( * ) Notice: Subject to any disclaimer, the term of this patent is extended or adjusted under 35 U.S.C. 154(b) by 0 days.

(21) Appl. No.: 09/509,983

(22) PCT Filed: Oct. 9, 1998

(86) PCT No.: PCT/NL98/00581

§ 371 (c)(1),
(2), (4) Date: Apr. 5, 2000

(87) PCT Pub. No.: WO99/20024

PCT Pub. Date: Apr. 22, 1999

(30) Foreign Application Priority Data

Oct. 10, 1997 (NL) .................................... 1007252

(51) Int. Cl.
*G06F 15/16* (2006.01)
(52) U.S. Cl. ...................... 709/229; 709/217; 709/225; 709/227; 709/230; 709/232; 709/237
(58) Field of Classification Search ................ 709/227, 709/230, 225, 232, 217, 229, 237
See application file for complete search history.

(56) References Cited

U.S. PATENT DOCUMENTS

| | | | |
|---|---|---|---|
| 4,763,357 A * | 8/1988 | Barr | |
| 4,805,206 A | 2/1989 | Beom-Chae | |
| 5,057,941 A | 10/1991 | Moriya | |
| 5,124,984 A * | 6/1992 | Engel | |
| 5,142,622 A * | 8/1992 | Owens | |
| 5,226,074 A | 7/1993 | Han | |
| 5,245,658 A | 9/1993 | Bush et al. | |
| 5,337,349 A | 8/1994 | Furohashi et al. | |
| 5,675,510 A | 10/1997 | Coffey et al. | |
| 5,701,301 A * | 12/1997 | Weisser, Jr. | |
| 5,742,762 A * | 4/1998 | Scholl et al. | |
| 5,826,029 A * | 10/1998 | Gore, Jr. et al. | |
| 5,864,683 A * | 1/1999 | Boebert et al. | |
| 6,003,084 A * | 12/1999 | Green et al. | |

(Continued)

FOREIGN PATENT DOCUMENTS

EP 0 509 525 10/1992

(Continued)

OTHER PUBLICATIONS

Http://en.wikipedia.org/wiki/Switch.*

(Continued)

*Primary Examiner*—Saleh Najjar
*Assistant Examiner*—Michael Y. Won
(74) *Attorney, Agent, or Firm*—Young & Thompson

(57) ABSTRACT

A method and a device for protecting data communication traffic between a first communication station and a second communication station, in which the data is dispatched according to a data protocol from the second to the first communication station. The method includes the steps of the comparison of the data protocol with at least one standardized protocol and the forwarding only of data of which the data protocol complies with the at least one standardized protocol to the first communication station. For this purpose, the device includes memory in which data of at least one standardized protocol have been stored and a comparison/forwarding part which compares the stored data characteristics with the data protocol and forward only data of which the data protocol complies with the at least one standardized protocol.

20 Claims, 1 Drawing Sheet

U.S. PATENT DOCUMENTS 6,430,150 B1 * 8/2002 Azuma et al.

FOREIGN PATENT DOCUMENTS

GB 0 265 158 9/1993

OTHER PUBLICATIONS

Http://www.du.edu/~jcalvert/tech/dccirc.htm—"Basic Circuits",Feb. 7, 2001.*

* cited by examiner

METHOD AND DEVICE FOR PROTECTING DATA COMMUNICATION

BACKGROUND OF THE INVENTION

The invention relates to a method and a device for protecting data communication traffic through a communication link between a first communication station and a second communication station, in which the data is dispatched according to a data protocol from the second communication station to the first communication station, comprising the steps of (i) receiving the data from the second communication station in a data communication protection device and (ii) comparing the data protocol of the data with at least one standardised protocol in the data communication protection device. In particular, data communication links are protected which can be seized by third parties by means of public and/or private data and telecommunication infrastructure.

Furthermore, the present invention relates to a data communication protection device arranged for protecting data communication traffic between a first communication station and a second communication station, data being dispatched according to a data protocol from the second communication station to the first communication station, the data communication protection device comprising memory means for storing data characteristics of at least one standardised protocol, the data communication protection device further being arranged for comparing the data protocol of the data with the at least one standardised protocol.

DESCRIPTION OF THE RELATED ART

Such a method and device are known from U.S. Pat. No. 5,124,984, which discloses a method for protecting data communication traffic between a first communication station and a second communication station, in which the data is dispatched according to a data protocol from the second to the first communication station, in which the data protocol is compared with at least one standardised protocol and data is forwarded to the first communication station only when the data protocol complies with the at least one standardised protocol. The disclosed method and system are directed to data networks, the network interconnecting a number of stations and a network access contoller. The network access controller is connected to the network and listens in on the data traffic on the network. The network access controller checks the content of each data package sent on the network and determines whether the packet is of an authorised type. It relies on control mechanisms present in the protocol that is being used in order to terminate communications between specific stations. It is disclosed that the network access controller 16 is not part of the physical path between communication stations.

Appliances are found to an increasing extent on the market which are provided with all option which makes it possible to provide so-called remote service. This involves, in particular, installed fax equipment, network fax equipment, telephone modems, cable modems, combined fax/modem configurations, telephone sets, answering machines, telephone exchanges, copying machines, washing machines and other domestic, industrial appliances and operating appliances which can communicate with one another via the said infrastructures. This relates to appliances which are installed separately and also in combination with other equipment. This remote service, also known as "remote diagnostics" or "remote maintenance" has been developed in order to be able to deliver a flexible and cheap method of support to the (end) users of the equipment.

Remote service, furthermore referred to as RDS ("Remote DiagnosticS") makes it possible to subject the respective appliance to an analysis via the said infrastructure from the location of the supplier or another service point. In a number of cases, it is even possible for the service engineer to be able to carry out small repairs remotely. If it emerges that repair has nevertheless to be carried out at the location of the appliance, the respective maintenance engineer or technician can be sent out with the correct components. Specifically, it is already known via RDS what is wrong with the appliance and what measures have to be taken to remedy the fault.

The functionality of RDS may comprise many advanced options:

The reading-out of the various counter positions; when a service is necessary can be determined by interpreting the counter positions.

The switching-on and switching-off of the visual and audible signals, for example, in the case of a fax machine; as a result it is possible to analyse the appliance remotely without disturbing the immediate environment.

The reading-out of a fax/telephone number list; in the event of an alteration of (service) telephone numbers, these can be altered remotely.

The reading-out of a fax log; the log usually contains the error codes of the last fax messages sent and these can be used by the technical support for the purpose of analysing the appliance.

The manipulation of the fax memory; this is intended to offer a final possibility for erasing the memory if this is not possible by means of the prescribed manner.

The alteration of the configuration settings; as a service, the appliance can be configured remotely in accordance with the wishes of the client.

The adding of connecting-through numbers; the service centre can then examine any damaged faxes itself and infer therefrom what the possible cause of the fault is.

Although the functionality mentioned is concentrated on fax machines, a comparable functionality may be present in the other equipment mentioned above. The RDS functionality can, in principle, comprise all the functionality which relates to operations concerning the memories (RAM, ROM, EEPROM) present in the appliance.

Many manufacturers of data communication devices make use of so-called custom chip sets (standard integrated circuits produced in large numbers) or accommodate hardware produced in large numbers and delivered to many manufacturers in a separate housing. The specifications of the manufacturer will, in many cases, describe only the functions desired by the manufacturer. It is therefore possible that (RDS) functionality is present in custom chip sets or hardware which is not made known to the end user.

In the modern information society, knowledge is power. Information is, of course, well protected by means of physical and organizational protection measures of all kinds. Documents may, for example, be seen only by a select group of individuals, after which they are securely stored in the safe. For the purpose of rapid decision-making and refreshing the information situation, consultation will often be made by telephone, in which case use is frequently made of the fax machine to transmit the documents to be discussed to one another. It is here that there is a weak point in the entire security chain. Essentially, the respective documents are made available to third parties, the intention being precisely to avoid that. Said third parties, who possibly have direct business interests or operate in the world of information brokerage, may acquire possession of valuable information. This may take place even without the owner of the sensitive information even having any indication until it is too late. The industrial spy therefore appears to be very near at hand and works, it is to be noted, together with the individual who has protected his own information with every means.

A fax machine has, for example, RDS functionality, whether this is known to the end user or not, and can thereby be manipulated by a third party. Said third party can ensure, for example, that the respective fax machine responds to certain fax numbers and/or fax identification numbers. During the transmission and/or reception of faxes from/to these fax numbers, the fax machine will transit, for example, an additional copy to the fax number specified by said third party. The user of the fax machine does not, however, notice anything in this case because the visual and audible signals can be switched off, the so-called fax through-connection number does not have to figure in the list of fax through-connection numbers and even the fax log does not have to report this operation. If necessary, a copy of the fax involved is transmitted only during the night hours when no-one is present in the company.

In the case of a network fax or a modem fax incorporated in a network system within a company, it is conceivable that a third party obtains access via said fax or said modem to the network system. As a result, it might be possible also to extract information in the manner mentioned above from the network system, which is believed to be safe.

SUMMARY OF THE INVENTION

The object of the present invention is to provide a method and a device for protecting data communication traffic in order to prevent third parties being able to make unnoticed use of functionality present in a communication station.

According to the invention, the object is achieved by means of a method of the type defined in the introduction, characterized by the steps of (iii) providing the data communication protection device in the communication link, the data from the second communication station to the first communication station passing through the data communication protection device and (iv) forwarding data of which the data protocol complies with the at least one standardised protocol from the data communication protection device to the first communication station, and not forwarding data of which the data protocol does not comply with the at least one standardised protocol from the data communication protection device to the fist communication station.

Repetitions of commands, or certain combinations of commands, which each belong per se to the standardized protocol but do not lead to normal, effective data communication traffic, are deemed not to belong to the standardized protocol. Specifically, it is possible that such repetitions or combinations of commands are used to switch on certain RDS functionality.

Before a fix machine, for example, can proceed to the reception and/or transmission of documents, the appliances at both ends of the communication link have to inform one another about the status they are in. After this so-called "handshake" procedure, the information exchange is mutually adapted. Both appliances are now ready and will carry out the desired task. This procedure and the information exchange proceeds according to internationally specified standards, also referred to as protocols, which are specified in part in the so-called ISO, ETSI and ANSI standards or in the ITU regulations. Before, during or after the "handshake" procedure, a check can take place on the presence of certain RDS functionality. To use RDS functionality, a manufacturer will use protocols which are not (entirely) incorporated in the standards. This means that the use of a so-called exotic protocol can indicate the use of RDS functionality. It indicates in any case that the other party is not adhering to the standard protocols. The negation of the standard indicates that the link made is being used in a manner other than that which the user intended.

As a result of using the method according to the invention, an attempt of a third party to switch on (concealed) RDS functionality from the outside will be unsuccessful, as a result of which the probability that information can leak out via the communication equipment used becomes substantially smaller.

Because, according to the invention, the data protocol is compared with standardized protocols, the method according to the invention can be used worldwide.

In an embodiment of the method according to the invention, the user of a communication station is warned if it emerges during the comparison of the data protocol that the latter does not belong to a known standardized protocol. As a result, the user is warned of an attempt of a third party to manipulate his communication station, whereupon the user can take direct action.

In a further embodiment of the method according to the invention, the link is interrupted if it emerges during the comparison of the data protocol that the latter does not belong to a standardized protocol. This has the result that any attempt to manipulate the communication station by a third party will be unsuccessful.

In a preferred embodiment of the method according to the invention, after ascertaining that the data protocol does not belong to a certain standardized protocol, a data file containing data of the data communication traffic and the second communication station is prepared. As a result of recording said data, the user is enabled to obtain as complete a picture as possible of the user of the second communication station, after which appropriate measures can be taken.

Another aspect of the invention provides a device suitable for carrying out the method according to the invention as defined in the preamble of claim 4. For this purpose, the device is further provided with a first link for linking the data communication protection device to the first communication station, and a second link for linking the data communication protection device to the second communication station, the data passing from the second communication station to the first communication station through the data communication protection device and comparison/forwarding means for forwarding data received through the second link of which the data protocol complies with the at least one standardised protocol from the data communication protection device trough the first link, and not forwarding data of which the data protocol does not comply with the at least one standardised protocol from the data communication protection device through the first link.

With the device according to the invention, it is possible to use the abovementioned method in a data communication environment. An advantage of the device according to the invention is that the user can determine himself, regardless of the brand and type of appliance, whether RDS functionality is permitted. Because the device can be used separately from the local communication station, there is no need to pay attention to any RDS functionality present when purchasing the local communication station.

As a result of the small number of components required, it is possible to manufacture the device in a compact, lightweight and robust form and to adapt it to the situation in which it is used. Furthermore, the operation and the connection of the device are simple.

Preferably, the memory means are designed as a ROM memory. As a result, it is impossible for the contents of the memory means to be manipulated during use, but it is still simple to adapt the device to the latest standardized protocols by replacing the ROM memory.

In an embodiment of the device, the device furthermore comprises warning means. If data is detected of which the data protocol does not comply with the at least one standardized protocol, the user is warned, for example by visual and/or audible warning means. As a result, the use will always be warned if an attempt is made to manipulate the first communication station, even if an attempt is made in these circumstances to switch off indications of the first communication station.

A further embodiment of the device according to the invention comprises display means linked to the comparison/forwarding means, the display means displaying data relating to the data communication traffic and the second communication station which are stored after it has emerged during the comparison of the data protocol that the latter does not comply with the at least one standardized protocol. This can be implemented, for example, as a display screen on the device itself.

As an addition, the device can be provided, in a further embodiment, with input means linked to the comparison/forwarding means for inputting commands relating to the display of the data.

An alternative embodiment of the invention is to provide it with interface means instead of the display means and/or the input means. Said interface means ensure the exchange of data relating to the data communication traffic and the second communication station with an external processing device, which data are stored after it has emerged during the comparison of the data protocol that the latter does not comply with the at least one standardized protocol. Said processing device may be, for example, a computer with which the data are processed further and can be displayed.

By means of the display of said data, the user is enabled to obtain as complete a picture as possible of the attempt to manipulate the local communication station, after which appropriate measures can be taken.

BRIEF DESCRIPTION OF THE DRAWINGS

According to an embodiment of the invention, the device can be integrated with the local communication station.

The method and the device according to the invention will now be explained further by reference to the drawings.

DESCRIPTION OF THE PREFERRED EMBODIMENTS

Figure 1:
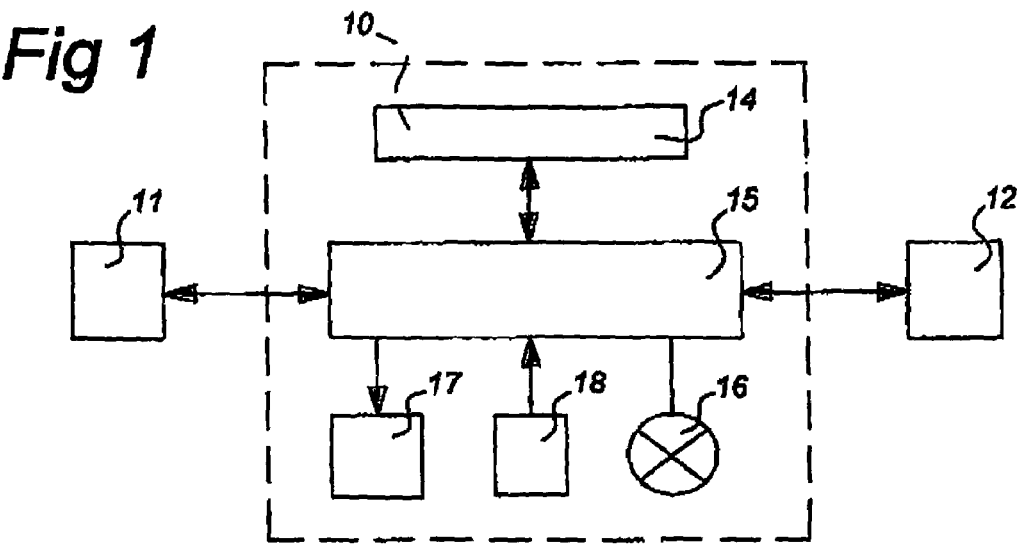
FIG. 1 shows a diagram of an embodiment according to the invention.

FIG. 1 shows a diagram of a preferred embodiment according to the invention in which the device 10 for protecting data communication traffic is linked to a first communication station 11 and a second communication station 12. The device 10 comprises comparison/forwarding means 15 which can communicate during operation both with the first communication station 11 and the second communication station 12. The device 10 furthermore comprises memory means 14 linked to the comparison/forwarding means 15. In the preferred embodiment of the invention shown, the device 10 furthermore comprises warning means 16, display means 17 and input means 18, all linked to the comparison/forwarding means 15. The communication stations 11 and 12 may be, for example, fax or copying machines provided with an RDS functionality.

In the memory means 14, the characteristics of the data communication are stored according to at least one standardized protocol. The comparison/forwarding means 15 serve to compare the data protocol of data which the second communication station wishes to dispatch to the first communication station 11 and to forward only data of which the data protocol complies with the at least one standardized protocol to the local communication station 11.

In the preferred embodiment shown, the device 10 also comprises warning means 16, which give a warning after it has emerged during the comparison of the data protocol that the latter does not comply with the at least one standardized protocol. The figure indicates that the warning means 16 are implemented as a warning lamp. However, it is possible to use other visual or audible warning means for this purpose.

In the preferred embodiment of the invention shown, the device 10 also comprises display means 17 for displaying data relating to the data communication traffic and the second communication station 12 which have been stored after it has emerged during the comparison of the data protocol that the latter does not comply with the at least one standardized protocol. Furthermore, the device comprises input means 18 for inputting commands relating to the display of the data. It is possible, for example, to input commands to display only a certain portion of the data on the display means.

In an embodiment of the invention not shown, the device 10 comprises, instead of the display means 17 and input means 18, interface means which can be linked to an external processing device. This processing device may be, for example, a computer with which the data can be processed further, stored and displayed.

Figure 2:
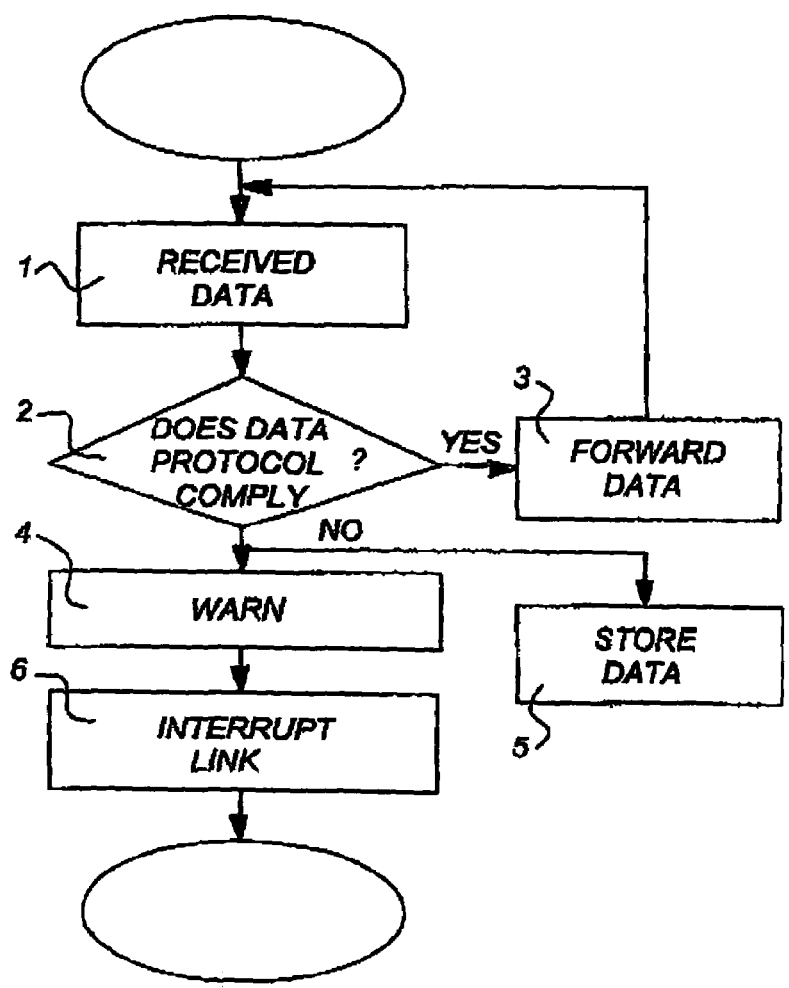
FIG. 2 shows a flow chart of the method according to the invention.

FIG. 2 shows the flow chart of the method according to the invention. The method begins with the reception of data from the second communication station 12 in block 1. In decision block 2, the data protocol of the data received in block 1 is compared with the standardized protocol. If the data protocol complies with the at least one standardized protocol, the data is forwarded to the first communication station 11 in forwarding block 3. The method then returns to block 1 to check the further data received.

If the data protocol does not comply with the at least one standardized protocol, the method continues the procedure in warning block 4, in which the user is warned. The following step in the procedure comprises the interrupt block 6, in which the link to the second communication station is interrupted. In a preferred embodiment of the method according to the invention, in block 5, a data file is stored in which data of the data communication traffic and the second communication station are stored in parallel with warning block 4 and interrupt block 6.

Using the method and device shown in the figures for protecting data communication traffic, an attempt of a third party to switch on (concealed) functionality from the outside will be unsuccessful, as a result of which the probability that information can leak out via the communication equipment used becomes appreciably smaller.

As a result of warning the user and recording data relating to the data communication traffic and the second communication station 12, the user is enabled to obtain as complete a picture as possible of the user of the second communication station, after which appropriate measures can be taken.

An advantage of the device described is that the user can determine himself, regardless of the brand and type of appliance whether RDS functionality is permitted. Because the device can be used separately from the first communication station, there is no need to pay attention to any RDS functionality present when purchasing the first communication station. Of course, the device 10 can also be physically incorporated in the first communication station 11. In that case, the comparison/forwarding means 15 can form an integral component of a processor present in the first communication station 11.

As a result of the comparison of the data protocol of the received data with standardized protocols, the method according to the invention can be used worldwide.

As a result of the small number of components required, it is possible to manufacture the device in a compact, lightweight and robust form and to adapt it to the situation in which it is used. Furthermore, the operation and the connection of the device are simple.

If the memory means are designed as a ROM memory, it is impossible for the contents of the memory means 14 to be manipulated during use, but it is still simple to adapt the device to the latest standardized protocols by means of replacing the ROM memory.

Although the device has been described for the protection of data communication traffic between two communication stations, it is, of course, also possible to protect the data communication traffic between a plurality of communication stations, such as, for example, in a network environment.

The invention claimed is:

1. Method for protecting data communication traffic between a first communication station (11) and a second communication station (12), in which the data is dispatched according to a data protocol from the second communication station to the first communication station, comprising the steps of:
   (i) receiving the data from the second communication station (12) in a data communication protection device (10),
   the protection device having i) a first input for connection to an incoming communication line receiving the data communication from the second communication station, ii) a second input for connection to the first communication station, iii) a comparison and forwarding module connected intermediate the first input and the second input and establishing a physical communication link between the first input and the second input, and iv) a memory connected to the comparison and forwarding module, the memory unit storing characteristics of a standardized communications protocol of first communication device,
   the comparison and forwarding module configured to compare the standardized communications protocol to a data protocol of incoming data from the first input, and i) to forward the incoming data to the second input when the comparison determines the data protocol conforms with the standardized communications protocol and ii) to physically open the communication link when the comparison determines the data protocol fails to conform with the standardized communication protocol;
   (ii) comparing the data protocol of the data with the standardized communication protocol in the data communication protection device (10), characterized by
   (iii) forwarding data of which the data protocol complies with the standardized communication protocol from the data communication protection device (10) to the first communication station (11), and not forwarding data of which the data protocol does not comply with the standardized communication protocol from the data communication protection device to the first communication station by physically opening the communication link within the protection device to prevent communications between the first communication station (11) and the second communication station (12).

2. Method according to claim 1, characterized in that, after it has emerged during the comparison of the data protocol that the latter does not comply with the at least one standardized protocol, a warning is generated.

3. Method according to claim 1, characterized in that, after it has emerged during the comparison of the data protocol that the latter does not comply with the at least one standardized protocol, a data file containing data of the data communication traffic and the second communication station (12) is stored.

4. Data communication protection device (10) arranged for protecting data communication traffic between a first communication station (1) and a second communication station (12), data being dispatched according to a data protocol from the second communication station to the first communication station, the data communication protection device comprising:
   a first input for connection to an incoming communication line receiving the data communication from the second communication station;
   a second input for connection to the first communication station;
   a comparison and forwarding module connected intermediate the first input and the second input and establishing a physical communication link between the first input and the second input; and
   a memory connected to the comparison and forwarding module,
   the memory unit storing characteristics of a standardized communications protocol of first communication device,
   the comparison and forwarding module configured to compare the standardized communications protocol to a data protocol of incoming data from the first input, and i) to forward the incoming data to the second input when the comparison determines the data protocol conforms with the standardized communications protocol and ii) to physically open the communication link when the comparison determines the data protocol fails to conform with the standardized communication protocol.

5. Data communication device according to claim 4, characterized in that the device furthermore comprises warning means (16) linked to the comparison/forwarding means (15) which give a warning after it has emerged during the comparison of the data protocol that it does not belong to the at least one standardized protocol.

6. Device according to claim 4, characterized in that the device furthermore comprises display means (17) linked to the comparison/forwarding means (15), the display means (17) displaying data relating to the data communication traffic and the second communication station (12), which data are stored after it has emerged during the comparison of the data protocol that the latter does not comply with the at least one standardized protocol.

7. Device according to claim 6, characterized in that the device furthermore comprises input means (18) linked to the comparison/forwarding means (15) for inputting commands relating to the display of the data.

8. Device according to claim 4, characterized in that the device comprises interface means for exchanging data relating to the data communication traffic and the second communication station (12) with an external processing device, which data are stored after it has emerged during the comparison of the data protocol that the latter does not comply with the at least one standardized protocol.

9. Device according to claim 4, characterized in that the device (10) is integrated in the first communication station (11).

10. A remote diagnostics and protective device, comprising:
a first input for connection to an incoming communication line;
a second input for connection to a communication apparatus;
a comparison and forwarding module connected intermediate the first input and the second input and establishing a physical communication link between the first input and the second input; and
a memory connected to the comparison and forwarding module,
the memory unit storing characteristics of a standardized communication protocol,
the comparison and forwarding module configured to compare the standardized communication protocol to a data protocol of incoming data from the first input, and i) to forward the incoming data to the second input when the comparison determines the data protocol conforms with the standardized communication protocol and ii) to physically open the communication link when the comparison determines the data protocol fails to conform with the standardized communication protocol.

11. The device of claim 10, wherein when the comparison and forwarding module opens the communication link, a data file of the incoming data is stored in the memory.

12. The device of claim 10, wherein,
the first input is for connection to an incoming telephone line;
the second input is for connection to a telefax machine; and
the memory unit stores characteristics of a standardized protocol of telefax communication,
the comparison and forwarding module is configured to compare the standardized telefax protocol to the data protocol of incoming data from the first input, and i) to forward the incoming data to the second input when the comparison determines the data protocol conforms with the standardized telefax protocol and ii) to physically open the communication link when the comparison determines the data protocol fails to conform with the standardized telefax protocol.

13. The device of claim 12, wherein when the comparison and forwarding module opens the communication link, a data file of the incoming data is stored in the memory.

14. The device of claim 10, wherein,
the first input is for connection to an incoming telephone line;
the second input is for connection to a photocopy machine; and
the memory unit stores characteristics of a standardized protocol of photocopy communication,
the comparison and forwarding module is configured to compare the standardized photocopy protocol to the data protocol of incoming data from the first input, and i) to forward the incoming data to the second input when the comparison determines the data protocol conforms with the standardized photocopy protocol and ii) to physically open the communication link when the comparison determines the data protocol fails to conform with the standardized photocopy protocol.

15. The device of claim 14, wherein when the comparison and forwarding module opens the communication link, a data file of the incoming data is stored in the memory.

16. The device of claim 10, wherein,
the second input is for connection to a telefax machine; and
the memory unit stores characteristics of a standardized protocol of telefax communication,
the comparison and forwarding module is configured to compare the standardized telefax protocol to the data protocol of incoming data from the first input, and i) to forward the incoming data to the second input when the comparison determines the data protocol conforms with the standardized telefax protocol and ii) to physically open the communication link when the comparison determines the data protocol fails to conform with the standardized telefax protocol.

17. The device of claim 16, wherein when the comparison and forwarding module opens the communication link, a data file of the incoming data is stored in the memory.

18. The device of claim 10, wherein,
the second input is for connection to a photocopy machine; and
the memory unit stores characteristics of a standardized protocol of photocopy communication,
the comparison and forwarding module is configured to compare the standardized photocopy protocol to the data protocol of incoming data from the first input, and i) to forward the incoming data to the second input when the comparison determines the data protocol conforms with the standardized photocopy protocol and ii) to physically open the communication link when the comparison determines the data protocol fails to conform with the standardized photocopy protocol.

19. The device of claim 18, wherein when the comparison and forwarding module opens the communication link, a data file of the incoming data is stored in the memory.

20. The device of claim 10, wherein the standardized communication protocol is other than a TCP/IP protocol component.

* * * * *